United States Patent
Karra

(10) Patent No.: US 10,489,867 B2
(45) Date of Patent: Nov. 26, 2019

(54) APPARATUS AND METHOD FOR DEPLOYING ANALYTICS

(71) Applicant: General Electric Company, Schenectady, NY (US)

(72) Inventor: Ravi Karra, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 15/381,971

(22) Filed: Dec. 16, 2016

(65) Prior Publication Data

US 2018/0174248 A1 Jun. 21, 2018

(51) Int. Cl.
| | |
|---|---|
| *G06Q 10/00* | (2012.01) |
| *G06Q 50/04* | (2012.01) |
| *G05B 19/418* | (2006.01) |
| *G06Q 10/06* | (2012.01) |
| *H04L 29/08* | (2006.01) |

(52) U.S. Cl.
CPC ....... *G06Q 50/04* (2013.01); *G05B 19/41855* (2013.01); *G06Q 10/063* (2013.01); *G05B 2219/31115* (2013.01); *H04L 67/12* (2013.01); *Y02P 90/30* (2015.11)

(58) Field of Classification Search
None
See application file for complete search history.

(56) References Cited

U.S. PATENT DOCUMENTS

| | | | | |
|---|---|---|---|---|
| 2013/0124465 A1* | 5/2013 | Pingel | ................... | G06F 3/0604 707/610 |
| 2013/0212420 A1* | 8/2013 | Lawson | ............. | G05B 19/4185 713/400 |
| 2014/0047064 A1* | 2/2014 | Maturana | .............. | H04L 67/125 709/217 |
| 2014/0047107 A1* | 2/2014 | Maturana | ................ | H04L 43/04 709/224 |
| 2015/0134733 A1* | 5/2015 | Maturana | ................ | H04L 43/04 709/203 |
| 2015/0276208 A1* | 10/2015 | Maturana | ................ | F22B 35/18 700/274 |
| 2015/0277399 A1* | 10/2015 | Maturana | .............. | G06F 9/5072 700/29 |
| 2015/0277404 A1* | 10/2015 | Maturana | .............. | G06F 9/5072 700/83 |

(Continued)

OTHER PUBLICATIONS

Brownlee, Jason, Deploy Your Predictive Model to Production, Machine Learning Mastery, https://machinelearningmastery.com/deploy-machine-learning-model-to-production/ , p. 1-16.*

*Primary Examiner* — Joseph M Waesco
(74) *Attorney, Agent, or Firm* — Fitch, Even Tabin & Flannery LLP

(57) ABSTRACT

A location where to deploy an analytic is determined. The location is at the cloud or at the site of the industrial machine. The analytic is configured to process data from an industrial machine. The analytic is obtained and is configured to communicate with one or more connectors. A first selected one of the one or more connectors is configured to communicate with a database. The analytic is configured so as to be interchangeable and operable at the cloud or at the site of an industrial machine. The analytic is then deployed at one or more of the cloud or the site of the industrial machine.

11 Claims, 6 Drawing Sheets

(56) References Cited

U.S. PATENT DOCUMENTS

| | | | | |
|---|---|---|---|---|
| 2015/0281233 | A1* | 10/2015 | Asenjo | G06F 21/44 |
| | | | | 726/7 |
| 2015/0341469 | A1* | 11/2015 | Lawson | G05B 19/4185 |
| | | | | 709/203 |
| 2016/0112283 | A1* | 4/2016 | Maturana | H04L 43/04 |
| | | | | 709/224 |
| 2016/0179993 | A1* | 6/2016 | Maturana | G06F 17/5009 |
| | | | | 703/7 |
| 2016/0282847 | A1* | 9/2016 | Germann | G05B 19/4065 |
| 2017/0019483 | A1* | 1/2017 | Maturana | H04L 67/125 |
| 2017/0102678 | A1* | 4/2017 | Nixon | G05B 17/02 |
| 2017/0102693 | A1* | 4/2017 | Kidd | G05B 19/41865 |
| 2017/0208151 | A1* | 7/2017 | Gil | G06F 21/57 |
| 2017/0220011 | A1* | 8/2017 | Hart | H04L 67/12 |
| 2017/0220012 | A1* | 8/2017 | Hart | H04L 67/12 |
| 2017/0220334 | A1* | 8/2017 | Hart | G06F 8/65 |
| 2017/0223026 | A1* | 8/2017 | Amiri | H04L 63/123 |
| 2017/0223057 | A1* | 8/2017 | Amiri | H04L 63/20 |
| 2017/0357250 | A1* | 12/2017 | Sandler | G05B 19/41835 |

* cited by examiner

APPARATUS AND METHOD FOR DEPLOYING ANALYTICS

BACKGROUND OF THE INVENTION

Field of the Invention

The subject matter disclosed herein generally relates to analytics and, more specifically, to the ability to deploy analytics at various locations.

Brief Description of the Related Art

Some types of industrial machines are used to perform various manufacturing operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Other industrial machines (e.g., windmills or other generators) produce electrical power. Typically, industrial machines are controlled at least in part by computer code (or a computer program) that is executed by a processor that is located at the machine.

Industrial machines have sensors or other types of measurement devices that gather data, for example, concerning the operation of the machine. Analytics are computer programs that in some aspects analyze the data produced by the sensors at the industrial machines. In these regards, analytics can perform various types of analysis on the data, and can present the results of the analysis to a user or operator.

Analytics are deployed in various locations. At these locations, the analytics need to communicate with different databases and typically process different data in different formats. Often, analytics need to be custom-written to fit the nuances of a particular operating environment. Because of these factors, the cost of producing and utilizing analytics is typically high.

This has caused some dissatisfaction with current approaches.

BRIEF DESCRIPTION OF THE INVENTION

The present invention is directed to analytics that can be deployed interchangeably at a wide variety of locations. For example, the same version or copy of an analytic may be deployed at one or both of the cloud or a local site (e.g., a factory or plant). The analytics may be optionally implemented and executed using a computerized industrial Internet of Things analytics platform that may be deployed at the location of the manufacturing process, at the manufacturing facility premise, or in the cloud. Since a custom-written version of the analytic need not be made for each separate location, costs are reduced and the user experience is enhanced.

In many of these embodiments, a location where to deploy an analytic is determined. The location is at the cloud or at the site of the industrial machine. The analytic is configured to process data from an industrial machine.

The analytic is obtained and is configured to communicate with one or more connectors. A first selected one of the one or more connectors is configured to communicate with a database. The analytic is configured so as to be interchangeable and operable at the cloud, or at the site of an industrial machine, by using connectors that connected to a local industrial system or database or cloud equivalents. The analytic is then deployed at one or more of the cloud, or the site of the industrial machine.

In aspects, the data is time series data. In other examples, the database is a historian. In other examples, the analytic utilizes one or more of an asset model and a financial model obtained from the database.

In others of these embodiments, a second selected one of the one or more connectors is coupled to a sensor at the industrial machine. In still other examples, the analytic is packaged in a file.

In others of these embodiments, a system includes a first processor, a first analytic, a first cloud connector, and a second cloud connector. The first processor is deployed at the cloud. The first analytic is deployed at the first processor. The first cloud connector is coupled to a first database and the first analytic, and the second cloud connector is coupled to a second database and the first analytic. The first analytic is configured to communicate with the first cloud connector and the second cloud connector. The first analytic is configured so as to be interchangeable and operable at the cloud, or at the site of an industrial machine. The first analytic receives the first data stored in the first database, and second data via the second cloud connector.

In aspects, the first data comprises an asset model or a financial model. In other examples, the second data comprises time series data from an industrial machine. In yet other examples, the second data comprises a local result provided by a local analytic at the industrial machine.

In other examples, a second processor is deployed at the site of the industrial machine. A second analytic is deployed at the second processor. A first local connector is coupled to a second database and the second analytic, and a second local connector is coupled to a sensor at the industrial machine and the second analytic. The second analytic is configured to communicate with the first local connector and the second local connector. The second analytic is configured so as to be interchangeable and operable at the cloud, or at the site of the industrial machine. The second analytic receives third data stored in the second database via the first local connector, and fourth data from the sensor via the second local connector.

In aspects, the third data comprises an asset model or a financial model. In other examples, the fourth data is time series data. In yet other aspects, the first database or the second database are historians.

A system includes a processor, an analytic, a first local connector, and a second local connector. The processor is deployed at a site of an industrial machine. The analytic is deployed at the processor. The first local connector is coupled to a database and the analytic. The second local connector is coupled to a sensor at the industrial machine and the analytic. The analytic is configured to communicate with the first local connector and the second local connector. The analytic is configured so as to be interchangeable and operable at the cloud or at the site of the industrial machine. The second analytic receives first data stored in the database via the first local connector, and second data from the sensor via the second local connector.

In aspects, the first data comprises an asset model or a financial model. In other examples, the second data is time series data. In yet other aspects, the database is a historian.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously provide that the same version or copy of an analytic may be deployed at one or both of the cloud or a local site (e.g., a factory or plant). The analytics may be optionally implemented and executed using a computerized industrial Internet of Things (IOT) analytics platform that may be deployed at the location of the manufacturing process, at the manufacturing facility premise or in the cloud. Since a custom-written version of the analytic need not be made for each separate location, costs are reduced and the user experience is enhanced.

As used herein, "computer code" or "software" means the physical representation of a computer program on physical media (e.g., different bit patterns stored at a storage media such as a disc drive or electronic memory). The computer code may be (or represent) various computer instructions, data structures, variables, or any other software element used in any type of computer program.

As used herein, an "analytic" is computer code or software that analyzes data or information supplied by a machine (or machines). Various types of analysis may be performed. For example, the data can be analyzed to determine whether the machine is operating properly. In another example, the data can be analyzed to predict future performance of the machine. The output of the analytic may be a control signal (or some other control mechanism) that causes various actions to occur. For example, the control signal (or other control mechanism) may cause an alert message to be formed and sent to a human operator or a central control office. In another example, the output of the analytic may control the operation of the machine. Other examples are possible. As described below, the analytic may be executed or implemented at an analytic platform either at the cloud or a local site.

Figure 1:
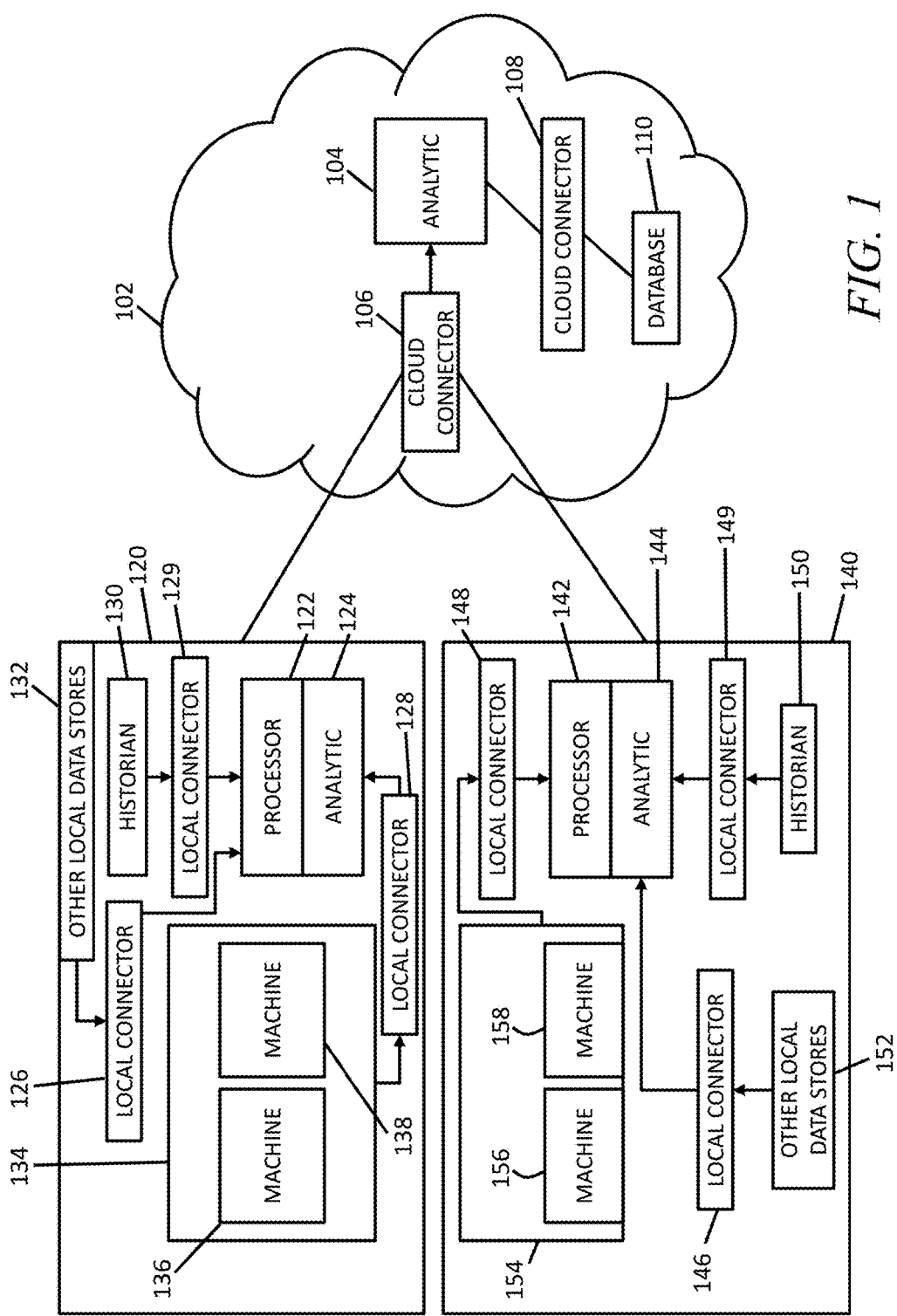
FIG. 1 comprises a block diagram that utilizes interchangeable analytics according to various embodiments of the present invention.

Referring now to FIG. 1, one example of a system 100 that includes universally deployable analytics is described.

The cloud 102 includes an analytic 104, a first cloud connector 106, a second cloud connector 108, and a database 110.

The cloud 102 is a computer network and may include routers, gateways, processors, and other devices. The analytic 104 is computer software or a computer program that receives information from industrial machines and analyzes this information. The analytic 104 may present the results of the analysis to analysis to a human operator, or may perform other actions. The database 110 is any type of memory storage device that stores information.

The first cloud connector 106 and the second cloud connector 108 are implemented as any combination of hardware or software. The first cloud connector 106 and the second cloud connector 108 are physically and logically separate from analytics, but connect to analytics. The first cloud connector 106 and the second cloud connector 108 perform translation functions. For example, the first cloud connector 106 translates information between a format used by the machines and a format used by the analytic. The second cloud connector 108 translates information between a format used by the database 110 and a format used by the analytic 104.

A first location 120 (e.g., factory or grouping of machines such as a wind farm) includes a processor or control circuit 122 that operates an analytic 124, a first local connector 126, a second local connector 128, a third local connector 129, a first historian 130, other databases 132, a grouping 134 of machines 136 and 138.

A second location 140 (e.g., factory or grouping of machines such as a wind farm) includes a processor or control circuit 142 that operates an analytic 144, a first local connector 146, a second local connector 148, a third local connector 149, a first historian 150, other databases 152, a grouping 154 of machines 156 and 158.

The first location 120 and the second location 140 may be, for example, within the vicinity of a factory or grouping of machines such as a wind farm. Other examples are possible. The processor or control circuits 122 and 142 may be implemented as any hardware or software.

The analytics 124 and analytic 144 are computer software or computer programs that receive information from industrial machines and analyze this information. The analytics 124 and 144 may present the results of the analysis to analysis to a human operator, or may perform other actions. In some examples, the analytics 104, 124, and 144 are exactly the same analytic both physically and logically. In other examples, the analytics 104, 124, and 144 are physically and logically different. In yet other examples, two of the analytics 104, 124, and 144 are physically and logically the same, while one is different.

In other examples, the analytics 104, 124, and 144 are packaged as files. For example, they are packaged as zip files. Other examples are possible.

The first local connector 126, second local connector 128, third local connector 129, fourth local connector 146, fifth local connector 148, and the sixth local connector 149 perform translation functions. For example, the first local connector 126 and the fourth local connector 146 translate information between formats used by the other local data stores 132, 152 and formats of the analytics 124, 144. The second local connector 128 and the fifth local connector 148 translate information between formats used by the machines 138, 158 and formats used by the analytics 124, 144. The third local connector 129 and the sixth local connector 149 translate information between formats used by the historians 129, 149 and formats used by the analytics 124, 144.

The first historian 130 and the second historian 150 are any type of memory devices that store historical information (e.g., archived time series data). The other databases 132 and 152 are any type of memory storage device (or devices) that store non-historical information such as information concerning the characteristics of assets. For example, the number of assets, their connectivity, and their operating characteristics (e.g., speed, voltages, and power) may be stored (e.g., as a model). In one example, the asset information (or model) indicates that the machine is a windmill, there are 10 windmills in a windfarm, and each windmill has 10 blades that are 30 feet long.

Financial information (which may be structured as a model) may also be stored in the other database 152. The financial information may include costs associated with the machine, the market for products or services created by the machine, and the values of products or services produced by the machine. In one example, the financial information (or model) indicates the value of the power output of a windmill for a day is stored.

The groupings 134 and 154 may be a factory, business, building, wind farm, or area within these areas. Other types of groupings are possible. The machines 136, 138, 156, and 158 are any type of industrial machine such as grinders, cappers, milling machines, or windmills. Other examples are possible.

In one example of the operation of the system of FIG. 1, the analytics 124 and 144 calculate a result related to their assigned machines (machines 136 and 138 for analytic 124, and machines 156 and 158 for analytic 144). In one example, the results are efficiencies. The results are then sent to analytic 104, which calculates or determines an overall result. In one example, an overall efficiency for all machines is calculated. For instance, if the machines 136, 138, 156, and 158 were windmills and groupings 134 and 154 were windfarms, analytic 124 may calculate an efficiency for windfarm 134, analytic 144 may calculate an efficiency for windfarm 154, and analytic 104 may calculate an efficiency for all windfarms. It will be appreciated that in this example no time series data is uploaded to the cloud 102.

Users may copy or download the analytic 104 from the cloud to the processors 122 and 142. In some aspects, analytics 104, 124 and 144 are identical. In other words, the analytic 104 is universal and is capable of being run anywhere without having to be internally modified. In aspects, the analytics 104, 124 and 144 are written in a common computer language, and depend upon the same asset and financial models.

Figure 2:
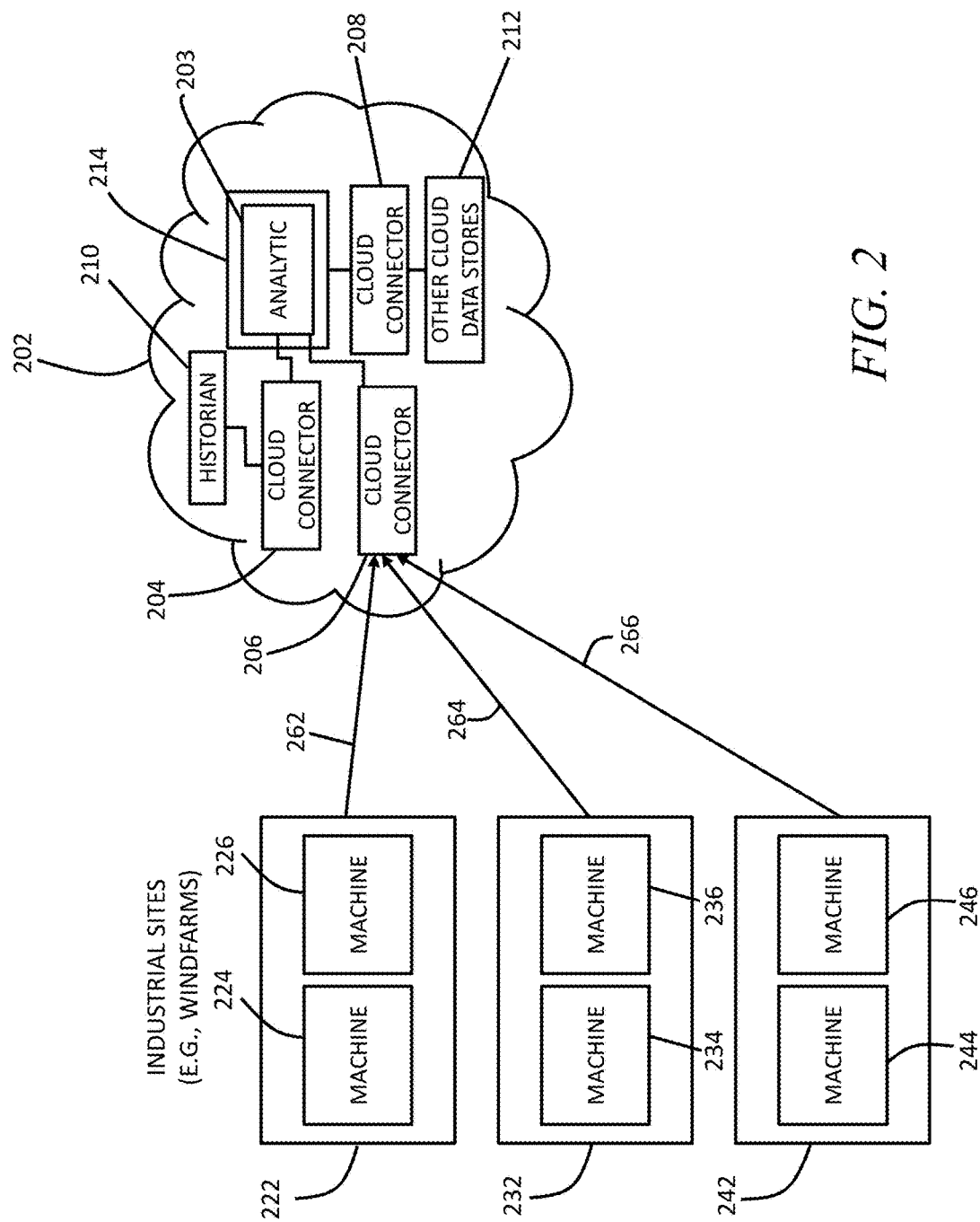
FIG. 2 comprises a block diagram of another system that utilizes interchangeable analytics according to various embodiments of the present invention.

Referring now to FIG. 2, another example of a system 200 with universally deployable analytics is described. The cloud 202 includes an analytic 203 (at or being executed by a processor 214), a first cloud connector 204, a second cloud connector 206, a third cloud connector 208, a historian 210, and other cloud data stores 212.

The cloud 202 is a computer network and may include routers, gateways, processors, and other devices. The analytic 203 is computer software or a computer program that receives information from industrial machines and analyzes this information. The analytic 203 may present the results of the analysis to analysis to a human operator, or may perform other actions.

The historian 210 is any type of memory storage device that stores historical information. The other cloud data stores 212 are any type of memory storage device that store non-historical data such as asset and financial data as has been described above.

The first cloud connector 204, second cloud connector 206, and third cloud connector 208 are implemented as any combination of hardware or software. The first cloud connector 204, second cloud connector 206, and third cloud connector 208 are physically and logically separate from analytics, but connect to analytics. The first cloud connector 204, second cloud connector 206, and third cloud connector 208 perform translation functions. For example, the first cloud connector 204 translates information between a format used by the historian 210 and a format used by the analytic 203. The second cloud connector 206 translates information (e.g., time series data) between a format used by the machines 224, 226, 234, 236, 244, 246, and a format used by the analytic 203. The third cloud connector 208 translates information between formats used by the other cloud data stores 212 (e.g., asset information or financial information) and a format used by the analytic 203.

A first location 242, second location 252, and third location 262 may be any type of location such as a factory, a plant, an office, a building, or wind farm. Other examples are possible.

The first machine 244, second machine 246, third machine 254, the fourth machine 256, the fifth machine 264, and the sixth machine 266 are any type of industrial machine such as grinders, cappers, milling machines, or windmills. Other examples are possible.

Time series data 262, 264, and 266 is produced at the machines 244, 246, and 248. The data is produced by sensors or other types of measurement devices at these machines. For example, the time series data may be pressure, temperature, or speed data. Other examples are possible.

The analytic 204 is configured with an interface that communicates the local connectors 204, 206, and 208. The analytic is configured so as to be interchangeable and operable at the cloud or at the site of an industrial machine. The analytic receives data stored in the database and received via the local connector via the interface.

In one example of the operation of the system of FIG. 2, machines 224, 226, 234, 236, 244, 246 produce time series data 262, 264, 266, which is sent to the analytic 203 via the cloud connector 206. The connection between the machines and the clouds may be wired, wireless, and through any combination of networks and network elements. Time series data 262, 264, 266, information from the historian 210, and/or information from the other cloud data stores 212 may be utilized by the analytic 203 to calculate a result. The results may be specific to machines in the groupings 222, 232, 242, relate to all machines in a grouping 222, 232, 242, or be an overall result for all machines in all groupings 222, 232, 242. For instance, if the machines 224, 226, 234, 236, 242, 246 were windmills, and groupings 222, 232, 242 were windfarms, analytic 203 may calculate an efficiency for individual machines, individual windfarms, or all windfarms. In aspects, the analytic 203 is capable of being operated at any of the machines 224, 226, 234, 236, 244, and 246, without modifying the analytic.

Figure 3:
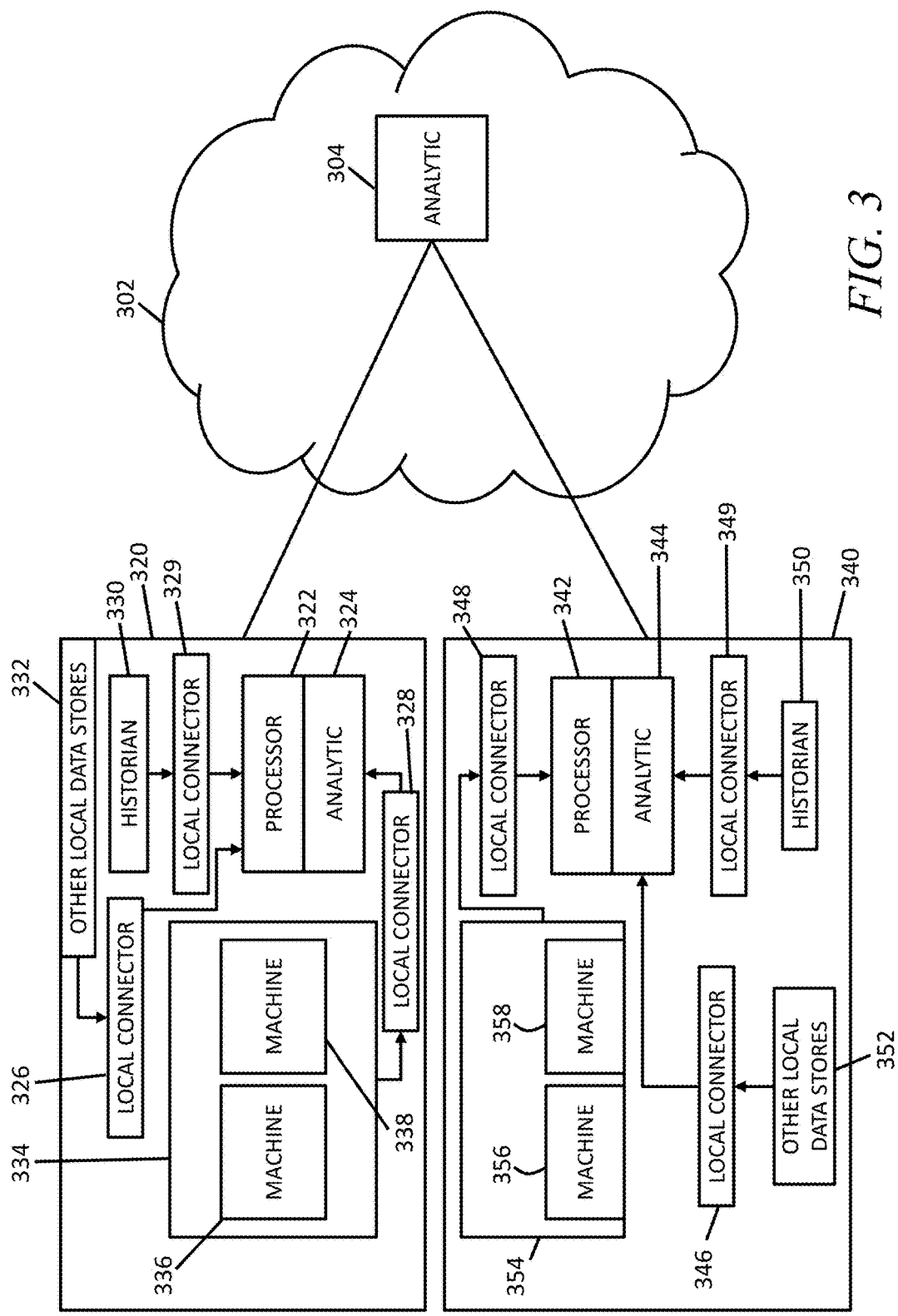
FIG. 3 comprises a block diagram of another system that utilizes interchangeable analytics according to various embodiments of the present invention.

Referring now to FIG. 3, yet another example of a system 300 that includes universally deployable analytics is described. Analytics may be developed at the cloud 302. The analytics may be downloaded from the cloud 302 to local sites. For example, an analytic 304 may be developed at the cloud and downloaded.

The cloud 302 is a computer network and may include routers, gateways, processors, and other devices. The analytic 304 is computer software or a computer program that receives information from industrial machines and analyzes this information. The analytic 304 may present the results of the analysis to analysis to a human operator, or may perform other actions.

A first location 320 (e.g., factory or grouping of machines such as a wind farm) includes a processor or control circuit 322 that operates an analytic 324, a first local connector 326, a second local connector 328, a third local connector 329, a first historian 330, other databases 332, and a grouping 334 of machines 336 and 338.

A second location 340 (e.g., factory or grouping of machines such as a wind farm) includes a processor or control circuit 342 that operates an analytic 344, a first local connector 346, a second local connector 348, a third local connector 349, a first historian 350, other databases 352, and a grouping 354 of machines 356 and 358.

The first location 320 and the second location 340 may be, for example, within the vicinity of a factory or grouping of machines such as a wind farm. Other examples are possible. The processor or control circuits 322 and 342 may be implemented as any hardware or software.

The analytics 324 and analytic 344 are computer software or computer programs that receive information from industrial machines and analyze this information. The analytics 324 and 344 may present the results of the analysis to analysis to a human operator, or may perform other actions. In some examples, the analytics 304, 324, and 344 are exactly the same analytic both physically and logically. In other examples, the analytics 304, 324, and 344 are physically and logically different. In yet other examples, two of the analytics 304, 324, and 344 are physically and logically the same, while one is different. In aspects, the analytics 304, 324, and 344 are exactly the same, are interchangeable, and can be executed at any location.

In other examples, the analytics 304, 324, and 344 are packaged as files. For example, they are packaged as zip files. Other examples are possible.

The first local connector 326, second local connector 328, third local connector 329, fourth local connector 346, fifth local connector 348, and the sixth local connector 349 perform translation functions. For example, the first local connector 326 and the fourth local connector 346 translate information between formats used by the other local data stores 332, 352 and formats used by the analytics 324, 344. The second local connector 328 and the fifth local connector 348 translate information between formats used by the machines 338, 358 and formats used by the analytics 324, 344. The third local connector 329 and the sixth local connector 349 translate information between formats used by the historians 329, 349 and formats used by the analytics 324, 344.

The first historian 330 and the second historian 350 are any type of memory devices that store historical information (e.g., archived time series data). The other databases 332 and 352 are any type of memory storage device (or devices) that store non-historical information such as information concerning the characteristics of assets. For example, the number of assets, their connectivity, and their operating characteristics (e.g., speed, voltages, and power) may be stored, for example in an asset model. In one example, the asset information indicates that the machine is a windmill, that there are 10 windmills in a windfarm, and that each windmill has 10 blades that are 30 feet long.

Financial information may also be stored in the other database 352, for example, as a financial model. The financial information may include costs associated with the machine, the market for products or services created by the machine, and the values of products or services produced by the machine. In one example, the value of the power output of a windmill for a day is stored.

The groupings 334 and 354 may be a factory, business, building, wind farm, or area within these areas. Other types of groupings are possible. The machines 336, 338, 356, and 358 are any type of industrial machine such as grinders, cappers, milling machines, or windmills. Other examples are possible.

In one example of the operation of the system of FIG. 3, the analytics 324 and 344 calculate a result related to data received from their assigned machines (machines 336 and 338 for analytic 324, and machines 356 and 358 for analytic 344). In one example, the results are efficiencies. For instance, if the machines 336, 338, 356, and 358 were windmills, and groupings 334 and 354 were windfarms, analytic 324 may calculate an efficiency for windfarm 334, analytic 344 may calculate an efficiency for windfarm 354. It will be appreciated that in this example no time series data is uploaded to the cloud 302. Users may copy or download the analytic 304 from the cloud to processors 322 and 342. In some aspects, analytics 304, 324 and 344 are identical.

Figure 4:
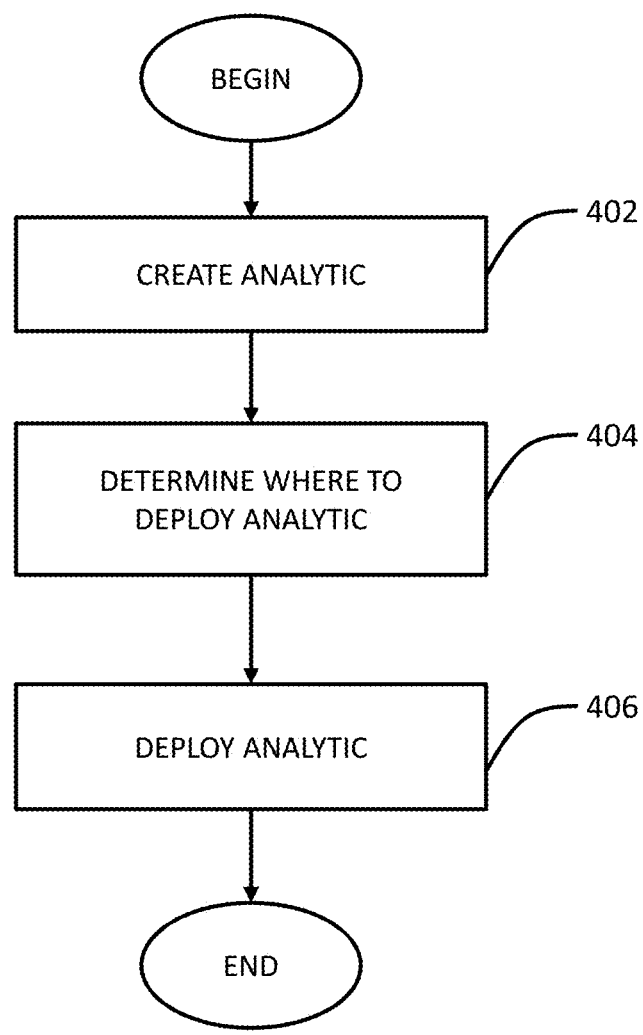
FIG. 4 comprises a flowchart of an approach for using interchangeable analytics according to various embodiments of the present invention.

Referring now to FIG. 4, an example of an approach that deploys analytics at different locations is described. At step 402, an analytic that processes information from an industrial machine is created. The analytic is configured with an interface that communicates with one or more connectors. The analytic is configured so as to be interchangeable and operable at the cloud, or at the site of an industrial machine.

At step 404, a location to deploy the analytic is determined. The location may be at the cloud, at another network, at a central location, home office, or a remote location such as a factory, plant, office, building, or wind farm. Other examples are possible.

At step 406, the analytic is deployed at one or more of the cloud, or the site of the industrial machine. The analytic may be downloaded and sent in any file structure (e.g., as a zip file).

Figure 5:
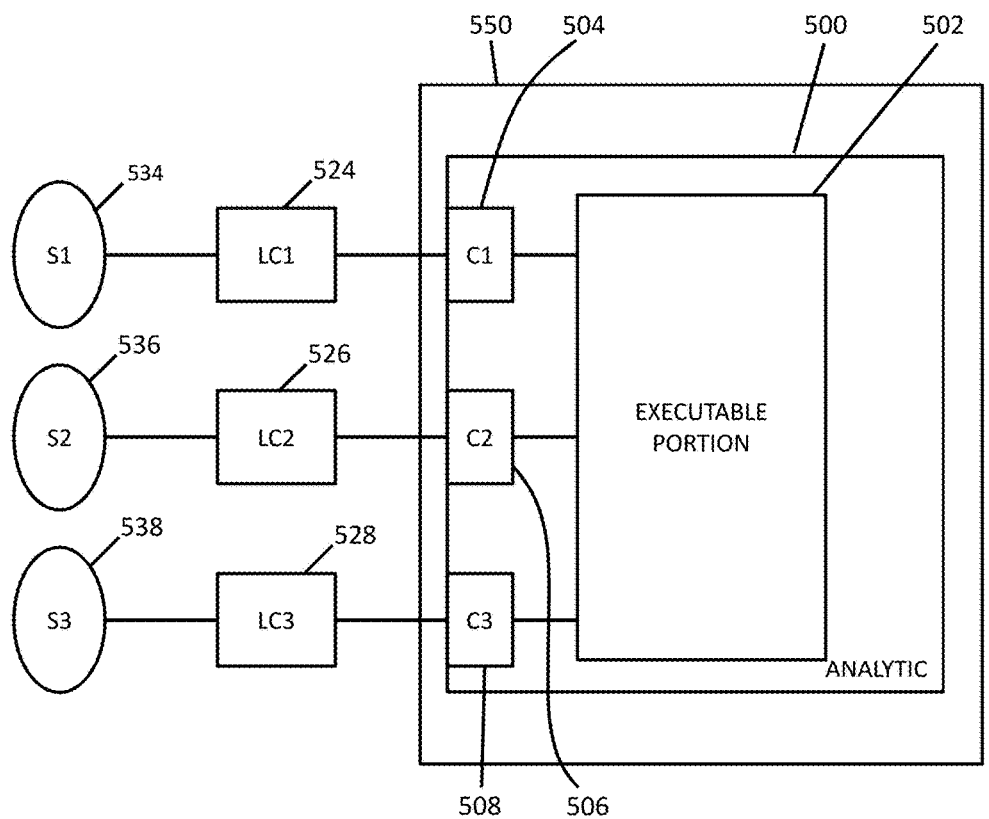
FIG. 5 comprises a block diagram of an analytic according to various embodiments of the present invention.

Referring now to FIG. 5, one example of an analytic 500 is described. The analytic has an executable portion 502, and connectors 504, 506, and 508. The connectors 504, 506, and 508 couple to external connectors 524, 526, and 528. The external connectors 524, 526, and 528 themselves couple to external data sources 534, 536, and 538. The analytic 500 is disposed physically in a package 550.

The executable portion 502 is executable computer code or computer instructions that performs a function (or functions). The code or instructions may be in any computer language. The executable portion 502 may be based upon or rely upon various asset and financial models. An asset model may specify asset information such as the number of assets, their connectivity, and their operating characteristics (e.g., speed, voltages, and power). In one example, the asset model may specify that the machine is a windmill, that there are 10 windmills in a windfarm, and that each windmill has 10 blades that are 30 feet long.

A financial model may specify financial information such as the costs associated with the machine, the market for products or services created by the machine, and the values of products or services produced by the machine. In one example, the value of the power output of a windmill for a day is stored in the financial model. The asset and financial models are stored in a database.

The connectors 504, 506, and 508 may be software elements that connect the executable portion to the local connectors 524, 526, and 528. Local connectors 524, 526, and 528 may be software elements that connect the connectors 504, 506, and 508 to the external data sources 534, 536, and 538. The connectors and local connectors may perform various translation functions between sources and destinations.

The external data sources 534, 536, and 538 may be data stores (e.g., data historians), or machines (e.g., that transmit time series data), or other source that transmits information.

The package 550 is a data structure that houses the executable portion 502, and the connectors. The analytic 500 (as encapsulated by the package 550) can be executed at the cloud, or at a processor located at a remote location, or at a processor located at the machine itself. Copies of analytics can be downloaded from the cloud. The downloading can be based on a pay-as-you-go basis, or users at remote locations can subscribe to certain analytics.

As mentioned, the analytics described herein may optionally be implemented using a computerized industrial internet of things analytics platform that may be deployed at the location of the manufacturing process, at the manufacturing facility premise, or in the cloud.

While progress with industrial equipment automation has been made over the last several decades, and assets have become "smarter," the intelligence of any individual asset pales in comparison to intelligence that can be gained when multiple smart devices are connected together. Aggregating data collected from or about multiple assets can enable users to improve business processes, for example by improving effectiveness of asset maintenance or improving operational performance if appropriate industrial-specific data collection and modeling technology is developed and applied.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

The systems and methods for managing industrial machines (also referred to assets herein) can include or can be a portion of an Industrial Internet of Things (IIoT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

Figure 6:
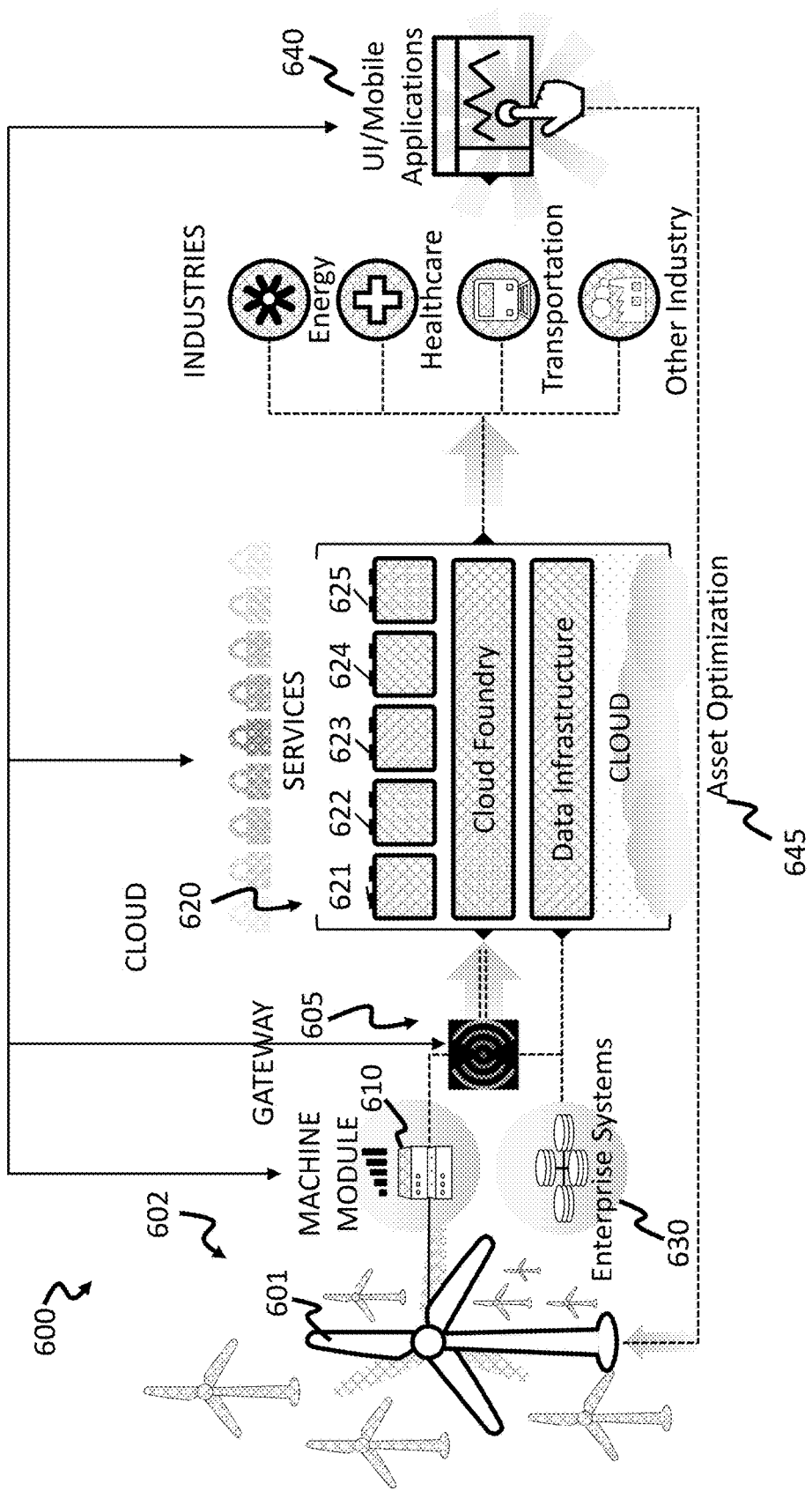
FIG. 6 comprises a block diagram showing an analytics platform where analytics can be deployed according to various embodiments of the present invention.

FIG. 6 illustrates generally an example of portions of a first AMP 800. As further described herein, one or more portions of an AMP can reside in an asset cloud computing system 820, in a local or sandboxed environment, or can be distributed across multiple locations or devices. An AMP can be configured to perform any one or more of data acquisition, data analysis, or data exchange with local or remote assets, or with other task-specific processing devices.

The first AMP 600 includes a first asset community 602 that is communicatively coupled with the asset cloud computing system 620. In an example, a machine module 610 receives information from, or senses information about, at least one asset member of the first asset community 602, and configures the received information for exchange with the asset cloud computing system 620. In an example, the machine module 610 is coupled to the asset cloud computing system 620 or to an enterprise computing system 630 via a communication gateway 605.

In an example, the communication gateway 605 includes or uses a wired or wireless communication channel that extends at least from the machine module 610 to the asset cloud computing system 620. The asset cloud computing system 620 includes several layers. In an example, the asset cloud computing system 620 includes at least a data infrastructure layer, a cloud foundry layer, and modules for providing various functions. In the example of FIG. 6, the asset cloud computing system 620 includes an asset module 621, an analytics module 622, a data acquisition module 623, a data security module 624, and an operations module 625. Each of the modules 621-625 includes or uses a dedicated circuit, or instructions for operating a general purpose processor circuit, to perform the respective functions. In an example, the modules 621-625 are communicatively coupled in the asset cloud computing system 620 such that information from one module can be shared with another. In an example, the modules 621-625 are co-located at a designated datacenter or other facility, or the modules 621-625 can be distributed across multiple different locations.

An interface device 640 can be configured for data communication with one or more of the machine module 610, the gateway 605, or the asset cloud computing system 620. The interface device 640 can be used to monitor or control one or more assets. In an example, information about the first asset community 602 is presented to an operator at the interface device 640. The information about the first asset community 602 can include information from the machine module 610, or the information can include information from the asset cloud computing system 620. In an example, the information from the asset cloud computing system 620 includes information about the first asset community 602 in the context of multiple other similar or dissimilar assets, and the interface device 640 can include options for optimizing one or more members of the first asset community 602 based on analytics performed at the asset cloud computing system 620.

In an example, an operator selects a parameter update for the first wind turbine 601 using the interface device 640, and the parameter update is pushed to the first wind turbine via one or more of the asset cloud computing system 620, the gateway 605, and the machine module 610. In an example, the interface device 640 is in data communication with the enterprise computing system 630 and the interface device 640 provides an operation with enterprise-wide data about the first asset community 602 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 640, the asset cloud computing system 620, the enterprise computing system 630, or elsewhere.

Returning again to the example of FIG. 6 some capabilities of the first AMP 600 are illustrated. The example of FIG. 6 includes the first asset community 602 with multiple wind turbine assets, including the first wind turbine 601. Wind turbines are used in some examples herein as non-limiting examples of a type of industrial asset that can be a part of, or in data communication with, the first AMP 600.

In an example, the multiple turbine members of the asset community 602 include assets from different manufacturers or vintages. The multiple turbine members of the asset community 602 can belong to one or more different asset communities, and the asset communities can be located locally or remotely from one another. For example, the members of the asset community 602 can be co-located on a single wind farm, or the members can be geographically distributed across multiple different farms. In an example, the multiple turbine members of the asset community 602 can be in use (or non-use) under similar or dissimilar environmental conditions, or can have one or more other common or distinguishing characteristics.

FIG. 6 further includes the device gateway 605 configured to couple the first asset community 602 to the asset cloud computing system 620. The device gateway 605 can further couple the asset cloud computing system 620 to one or more other assets or asset communities, to the enterprise computing system 630, or to one or more other devices. The first AMP 600 thus represents a scalable industrial solution that extends from a physical or virtual asset (e.g., the first wind turbine 601) to a remote asset cloud computing system 620. The asset cloud computing system 620 optionally includes a local system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 624 in the asset cloud computing system 620. In an example, an external sensor can be used to sense information about a function of an asset, or to sense information about an environment condition at or near an asset. The external sensor can be configured for data communication with the device gateway 605 and the data acquisition module 624, and the asset cloud computing system 620 can be configured to use the sensor information in its analysis of one or more assets, such as using the analytics module 622.

In an example, the first AMP 600 can use the asset cloud computing system 620 to retrieve an operational model for the first wind turbine 601, such as using the asset module 621. The model can be stored locally in the asset cloud computing system 620, or the model can be stored at the enterprise computing system 630, or the model can be stored elsewhere. The asset cloud computing system 620 can use the analytics module 622 to apply information received about the first wind turbine 601 or its operating conditions (e.g., received via the device gateway 605) to or with the retrieved operational model. Using a result from the analytics module 622, the operational model can optionally be updated, such as for subsequent use in optimizing the first wind turbine 601 or one or more other assets, such as one or more assets in the same or different asset community. For example, information about the first wind turbine 601 can be analyzed at the asset cloud computing system 620 to inform selection of an operating parameter for a remotely located second wind turbine that belongs to a different second asset community.

The first AMP 600 includes a machine module 610. The machine module 610 includes a software layer configured for communication with one or more industrial assets and the asset cloud computing system 620. In an example, the machine module 610 can be configured to run an application locally at an asset, such as at the first wind turbine 601. The machine module 610 can be configured for use with or installed on gateways, industrial controllers, sensors, and other components. In an example, the machine module 610 includes a hardware circuit with a processor that is configured to execute software instructions to receive information about an asset, optionally process or apply the received information, and then selectively transmit the same or different information to the asset cloud computing system 620.

In an example, the asset cloud computing system 620 can include the operations module 625. The operations module 625 can include services that developers can use to build or test Industrial Internet applications, or the operations module 625 can include services to implement Industrial Internet applications, such as in coordination with one or more other AMP modules. In an example, the operations module 625 includes a microservices marketplace where developers can publish their services and/or retrieve services from third parties. The operations module 625 can include a development framework for communicating with various available services or modules. The development framework can offer developers a consistent look and feel and a contextual user experience in web or mobile applications.

In an example, an AMP can further include a connectivity module. The connectivity module can optionally be used where a direct connection to the cloud is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 605 between the machine module 610 and the asset cloud computing system 620.

In an example, an AMP can be configured to aid in optimizing operations or preparing or executing predictive maintenance for industrial assets. An AMP can leverage multiple platform components to predict problem conditions and conduct preventative maintenance, thereby reducing unplanned downtimes. In an example, the machine module 610 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 610 or at the asset cloud computing system 620.

In response to the detected error conditions, the AMP can issue various mitigating commands to the asset, such as via the machine module 610, for manual or automatic implementation at the asset. In an example, the AMP can provide a shut-down command to the asset in response to a detected error condition. Shutting down an asset before an error condition becomes fatal can help to mitigate potential losses or to reduce damage to the asset or its surroundings. In addition to such an edge-level application, the machine module 610 can communicate asset information to the asset cloud computing system 620.

In an example, the asset cloud computing system 620 can store or retrieve operational data for multiple similar assets. Over time, data scientists or machine learning can identify patterns and, based on the patterns, can create improved physics-based analytical models for identifying or mitigating issues at a particular asset or asset type. The improved analytics can be pushed back to all or a subset of the assets, such as via multiple respective machine modules 610, to effectively and efficiently improve performance of designated (e.g., similarly-situated) assets.

In an example, the asset cloud computing system 620 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation.

In a further example, the asset cloud computing system 620 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 620 can include a data services module that can facilitate application development. For example, the data services module can enable developers to bring data into the asset cloud computing system 620 and to make such data available for various applications, such as applications that execute at the cloud, at a machine module, or at an asset or other location. In an example, the data services module can be configured to cleanse, merge, or map data before ultimately storing it in an appropriate data store, for example, at the asset cloud computing system 620. A special emphasis has been placed on time series data, as it is the data format that most sensors use.

Security can be a concern for data services that deal in data exchange between the asset cloud computing system 620 and one or more assets or other components. Some options for securing data transmissions include using Virtual Private Networks (VPN) or an SSL/TLS model. In an example, the first AMP 600 can support two-way TLS, such as between a machine module and the security module 624. In an example, two-way TLS may not be supported, and the security module 624 can treat client devices as OAuth users. For example, the security module 624 can allow enrollment of an asset (or other device) as an OAuth client and transparently use OAuth access tokens to send data to protected endpoints.

In the example of FIG. 6, it will be understood that the approaches described herein with respect to FIGS. 1-5 may be implemented using the AMP 600, which may be deployed at the first asset community 602, at the wind turbine 601, or in the cloud 620. In aspects, the analytics described herein may be deployed at any of these locations using the structures of FIG. 6.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method, comprising:
   deploying a processor at an industrial machine at an industrial location, the industrial location being a location that is remote from the cloud, the processor uploading time series data to the cloud,
   deploying an analytic at the cloud, the analytic being configured to process the time series data from the industrial machine;
   subsequently and at the cloud, making an exact copy of the analytic and downloading the exact copy of the analytic from the cloud and deploying the exact copy of the analytic at a controller at the industrial location such that the exact copy of the analytic is physically and logically the same as the analytic deployed at the cloud;

wherein the exact copy of the analytic being is configured to communicate with one or more connectors, a first selected one of the one or more connectors configured to communicate with a database, the analytic being configured so as to be interchangeable and operable at the cloud or at the site of an industrial machine;

wherein the exact copy of the analytic is executed by the controller at the industrial location and, based upon the execution, the exact copy of the analytic sends a control signal that is used to control an operation of the industrial machine and cause an alert message to be sent to an operator or central office; and wherein after the exact copy of the analytic is downloaded to the controller at the industrial machine, the time series data from industrial machine is no longer uploaded to the cloud.

2. The method of claim 1 wherein the database is a historian.

3. The method of claim 1 wherein a second selected one of the one or more connectors is coupled to a sensor at the industrial machine.

4. The method of claim 1, wherein the analytic is packaged in a file.

5. The method of claim 1, wherein the analytic utilizes one or more of an asset model and a financial model obtained from the database.

6. A system, comprising:
a first processor deployed at the cloud;
a first analytic deployed at the first processor;
a first cloud connector coupled to a first database and the first analytic;
a second cloud connector coupled to a second database and the first analytic;
wherein the first analytic is configured to communicate with the first cloud connector and the second cloud connector, the first analytic being configured so as to be interchangeable and operable at the cloud or at the site of an industrial machine;
wherein the first analytic receives the first data stored in the first database, and second data via the second cloud connector,
a second processor deployed at the site of the industrial machine, the site being remote from the cloud, the second processor uploading time series data to the cloud;
wherein, at the first processor at the cloud, an exact copy of the first analytic is made and the exact copy of the first analytic is downloaded from the cloud to and deployed at the second processor such that the exact copy of the first analytic is physically and logically the same as the first analytic deployed at the cloud;
wherein the exact copy of the first analytic is executed by the second processor and, based upon the execution, the exact copy of the first analytic sends a control signal that is used to control an operation of the industrial machine e-F and cause an alert message to be sent to an operator or central office; and
wherein after the exact copy of the first analytic is downloaded to the second processor, the time series data from industrial machine is no longer uploaded to the cloud.

7. The system of claim 6, wherein the first data comprises an asset model or a financial model.

8. The system of claim 6 wherein the first database is a historian.

9. A system, comprising:
a processor deployed at a site of an industrial machine at an industrial location, the industrial location being a location that is remote from the cloud, the industrial machine uploading time series data to the cloud;
a copied analytic deployed at the processor wherein the copied analytic is an exact copy of a cloud analytic deployed at the cloud, the copied being downloaded from the cloud such that the copied analytic is physically and logically the same as the cloud analytic;
a first local connector coupled to a database and the copied analytic;
a second local connector coupled to a sensor at the industrial machine and the copied analytic;
wherein the copied analytic is configured to communicate with the first local connector and the second local connector, the copied analytic being configured so as to be interchangeable and operable at the cloud or at the site of the industrial machine;
wherein the copied analytic receives first data stored in the database via the first local connector, and second data from the sensor via the second local connector,
wherein the copied analytic is executed by the processor at the industrial location and, based upon the execution, the copied analytic sends a control signal that is used to control an operation of the industrial machine and cause an alert message to be sent to an operator or central office, and
wherein before the copied analytic is executed at the processor, time series data is uploaded from the processor to the cloud, and after the copied analytic is downloaded to the controller at the industrial machine, the time series data from industrial machine is no longer uploaded to the cloud.

10. The system of claim 9, wherein the first data comprises an asset model or a financial model.

11. The system of claim 9 wherein the database is a historian.

* * * * *